United States Patent Office 2,746,072
Patented May 22, 1956

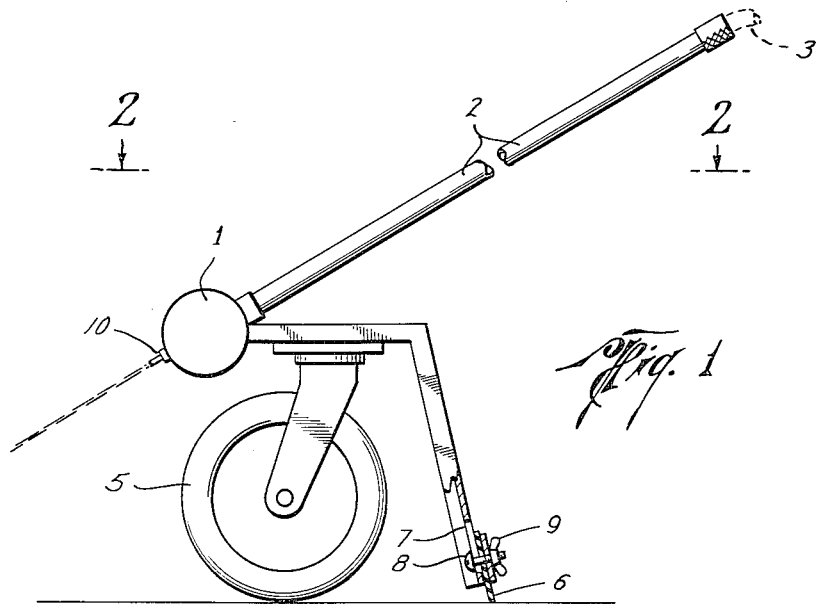
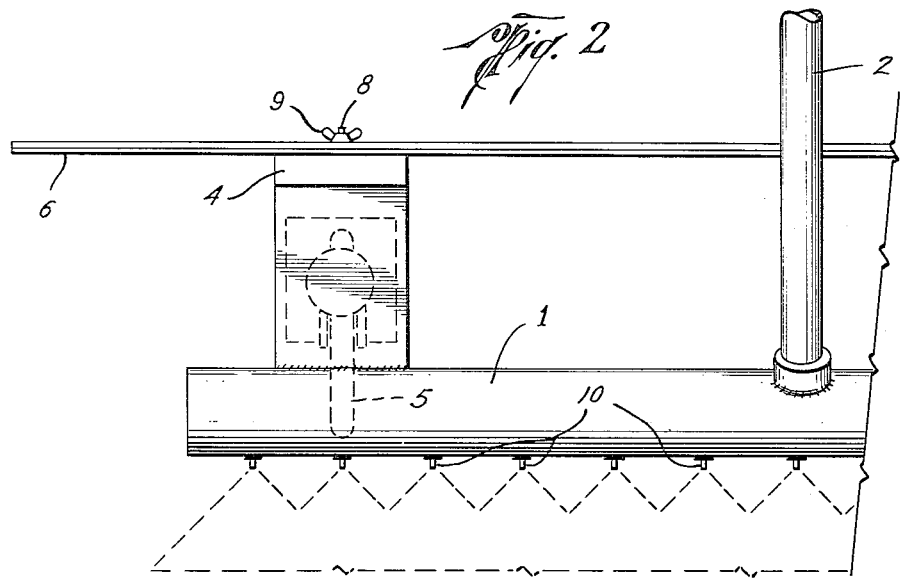

2,746,072

WATER SPRAY FOR WASHING CONCRETE PAVEMENT

James LeRoy Lumpkin, Beaumont, Tex.

Application April 15, 1954, Serial No. 423,339

1 Claim. (Cl. 15—127)

The invention concerns a water spray for washing concrete pavement. It concerns more particularly a hand tool suitable for use in washing the driveways of filling stations and other paved surfaces.

It is an object of the invention to provide a water spray in which a plurality of streams of water are discharged from the spray at high velocity, and in which the effluent streams of water are utilized to effect a beating, scrubbing and sweeping action.

Another object of the invention is to provide a water spray in which the desired washing, scrubbing and sweeping action is effected by the effluent streams of water alone, and which employs no brushes, brooms or other devices for that purpose.

A still further object of the invention is to provide a water spray which is capable of washing paved surfaces with a minimum expenditure of time and water.

The invention contemplates a water spray of the type described which is capable of directing a plurality of streams of water against a paved surface, at high velocity and in fan shaped patterns, the several streams overlapping and commingling with each other to form a continuous blast of water arranged in a substantially straight line. The invention further contemplates a water spray having incorporated therein a squeegee blade for use in clearing the surface acted upon of surplus water, and in which the squeegee blade serves also as a support for the remainder of the structure.

The invention will be readily understood by referring to the following description and the accompanying drawing, in which:

Fig. 1 is a side elevational view of a water spray embodying the invention.

Fig. 2 is a plan view taken on the line 2—2 of Fig. 1, showing one side only of the spray, the two sides thereof being identical.

Referring to the drawing, the water spray of the invention comprises a T-shaped frame including a cylindrical member 1 and a tubular handle member 2, the handle member 2 being in fluid communication with the cylindrical member 1. The handle member 2 is disposed at right angles to the cylindrical member 1, and one end of the handle member 2 is rigidly connected to the cylindrical member 1 intermediate its ends. The cylindrical member 1 preferably is of substantially larger diameter than the handle member 2, and is closed at its ends. The end of the handle member 2 opposite the cylindrical member 1 is connected to a flexible conduit 3 whereby the spray may be supplied with water.

The cylindrical member 1 is normally disposed horizontally, and is mounted on a plurality of wheeled supports, as hereinafter described, which are spaced longitudinally with respect to the cylindrical member 1. Each of the wheeled supports consists of an angular bracket 4 and a swivel type wheel or caster 5. Each of the brackets 4 has a horizontal portion and a vertical portion, the horizontal portion being rigidly connected to the cylindrical member 1, and extending rearwardly therefrom, and the vertical portion being rigidly connected to the rearward edge of the horizontal portion and extending downwardly therefrom. The swivel type wheel 5 is mounted on the under side of the horizontal portion of the bracket 4.

A squeegee blade 6, which is disposed horizontally parallel to the cylindrical member 1, is adjustably mounted on the lower ends of the vertical portions of the brackets 4 whereby it may be raised and lowered with respect thereto. A longitudinal slot 7 is formed in the vertical portion of each of the brackets 4 for engagement by a bolt 8, having a wing nut 9, whereby the squeegee blade 6 is clamped to the brackets 4. The weight of the cylindrical member 1, which is disposed forwardly with respect to the wheels 5, is counterbalanced by the weight of the handle member 2, so that the squeegee blade 6 normally rests upon the floor.

The entire structure above described, with the exception of the rubber portions of the wheel 5 and the squeegee blade 6, advantageously may be made of aluminum or other light weight metal.

The cylindrical member 1 may be of any length desired, from about 2 feet to about 12 feet, for example.

A plurality of nozzles 10 are connected to the leading edge of the cylindrical member 1 and spaced longitudinally with respect thereto. The nozzles 10 are in fluid communication with the interior of the cylindrical member 1, and are arranged to discharge fluid forwardly and downwardly with respect thereto. The nozzles 10 are relatively small, and have flattened tips whereby they are capable of discharging fluid at high velocity and in fan shaped patterns, the effluent streams from the several nozzles overlapping and commingling with each other to form a continuous blast of water arranged in a substantially straight line.

In the embodiment of the invention above described the desired washing, scrubbing and sweeping action is effected by the effluent streams of water alone. The sole function of the squeegee blade 6 is to carry away excess moisture.

The water spray of the invention is capable of being operated with an available water pressure of the order of 50 pounds per square inch, and its operation becomes even more effective as the water pressure is increased. When used in conjunction with an automatic automobile washing system having an available water pressure of the order of 190 pounds per square inch, for example, the spray is 10 times as effective as when operated with an available water pressure of the order of 50 pounds per square inch, and is capable of washing a given surface area in 1/10 of the time required when operating on the lower water pressure.

The invention may be modified in various ways without departing from the spirit and scope thereof.

I claim:

In a water spray for washing paved surfaces, a T-shaped frame including a cylindrical member and a tubular handle member, the handle member being in fluid communication with the cylindrical member and being disposed at right angles thereto, one end of the handle member being rigidly connected to the cylindrical member intermediate its ends, the cylindrical member being of substantially larger diameter than the handle member and being closed at its ends, the cylindrical member being normally disposed horizontally and being mounted on a plurality of wheeled supports spaced longitudinally with respect to the cylindrical member, the wheeled supports each consisting of a bracket supported upon wheel means, each of the brackets including an intermediate portion positioned directly above the wheel means, a forwardly extending end portion rigidly connected to the cylindrical member, and a rearwardly and downwardly extending end portion, a plurality of nozzles connected to the leading edge of the cylindrical member and spaced longitudinally with respect thereto, the nozzles being in fluid communication with the interior of the cylindrical member and being arranged to discharge fluid forwardly and downwardly with respect thereto, the nozzles being relatively small and having flattened tips whereby they are capable of discharging fluid at high velocity and in fan shaped patterns, the flattened tips of the nozzles being aligned with each other and the nozzles being so spaced that the effluent streams from the several nozzles overlap and commingle with each other to form a continuous blast of water arranged in a substantially straight line, and a squeegee blade disposed horizontally parallel to the cylindrical member and adjustably mounted on the lower ends of the rearwardly and downwardly extending end portions of the brackets whereby it may be raised and lowered with respect thereto, the cylindrical member being disposed forwardly with respect to the wheels and the weight of the cylindrical member being counter-balanced by the weight of the handle member so that the squeegee blade normally rests upon the supporting surface.

References Cited in the file of this patent

UNITED STATES PATENTS

| | | |
|---|---|---|
| 418,959 | Pilson | Jan. 7, 1890 |
| 913,801 | Ansley | Mar. 2, 1909 |
| 1,724,702 | Flickinger | Aug. 13, 1929 |
| 2,061,585 | Meyer | Nov. 24, 1936 |
| 2,144,890 | Nakaoka | Jan. 24, 1939 |
| 2,246,640 | Shurhay | June 24, 1941 |
| 2,607,622 | Doepke | Aug. 19, 1952 |
| 2,638,730 | Davidson | May 19, 1953 |
| 2,655,408 | Williams | Oct. 13, 1953 |
| 2,692,163 | Geel | Oct. 19, 1954 |